United States Patent [19]
Grimpe

[11] 3,961,853
[45] June 8, 1976

[54] SHRUNK FIT COUPLING
[75] Inventor: Karl Grimpe, Mulheim, Germany
[73] Assignee: DEMAG Aktiengesellschaft, Duisburg, Germany
[22] Filed: Apr. 18, 1975
[21] Appl. No.: 569,184

Related U.S. Application Data
[63] Continuation of Ser. No. 439,978, Feb. 6, 1974.

[30] Foreign Application Priority Data
      Feb. 8, 1973    Germany.....................2306215.9

[52] U.S. Cl. ......................... 403/273; 403/359
[51] Int. Cl.² ................................... F16B 4/00
[58] Field of Search ... 403/15, 16, 26, 273, 359, 368, 403/370

[56] References Cited
UNITED STATES PATENTS

| | | | |
|---|---|---|---|
| 441,170 | 11/1890 | Kidder | 403/16 |
| 611,603 | 10/1898 | Bradley | 403/259 |
| 2,938,260 | 5/1960 | Holben et al. | 29/427 UXR |
| 3,190,681 | 6/1965 | Liebe | 403/15 |

FOREIGN PATENTS OR APPLICATIONS
| | | | |
|---|---|---|---|
| 54,543 | 11/1910 | Switzerland | 403/359 |

*Primary Examiner*—Andrew V. Kundrat
*Attorney, Agent, or Firm*—Mandeville and Schweitzer

[57] ABSTRACT

An improved shrunk fit coupling of the type uniting an exterior cylindrical sleeve with an interior cylindrical hub is disclosed herein. The improvement resides in the formation and arrangement of cooperating lands and grooves oriented on the mating surfaces of the coupled elements in a manner whereby, upon heating of the shrunken sleeve to expand the same relative to the hub upon which it is supported, the coupled elements may be readily and permanently separated and further loosened by minimal relative displacement of one to the other either axially or radially, as the case might be, for longitudinal, axially oriented grooves or radially oriented, i.e., annular grooves, respectively.

6 Claims, 4 Drawing Figures

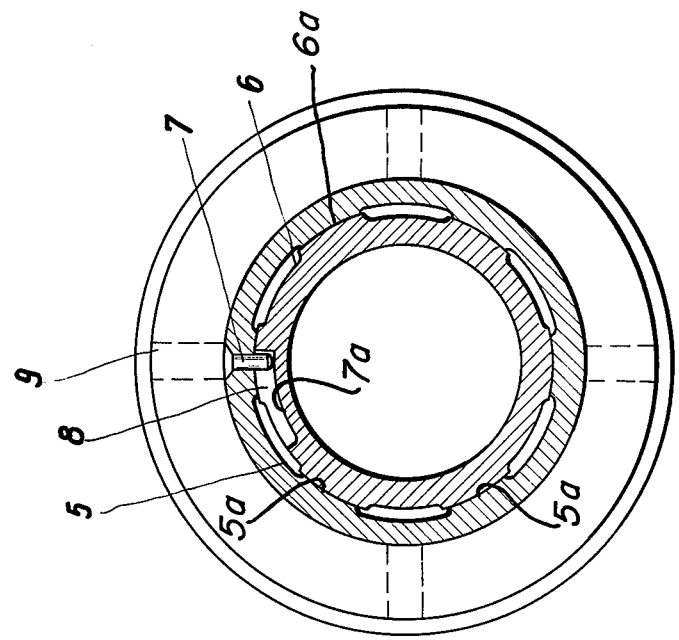
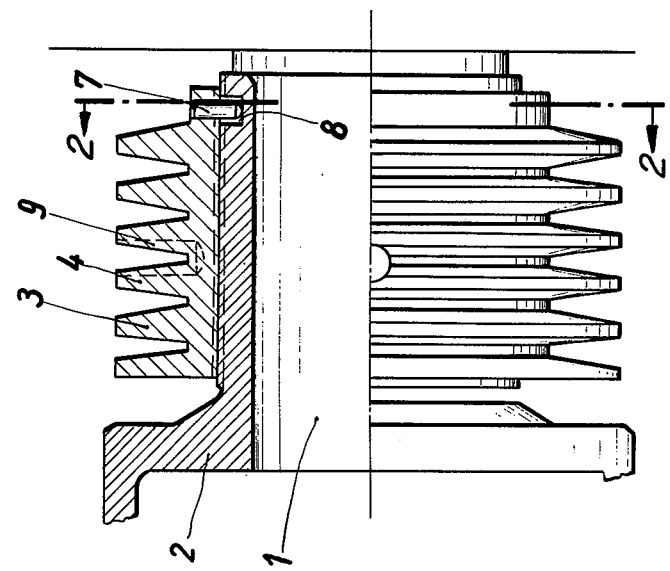

SHRUNK FIT COUPLING

This is a continuation of application, Ser. No. 439,978, filed February 6, 1974 and now abandoned.

BACKGROUND OF THE INVENTION

It is well known that concentric pairs of elements, such as a sleeve and shaft or sleeve and hub, may be firmly united through a tightly fit coupling developed by the contraction or shrinking of the outer element with respect to the inner element. This arrangement has been expecially advantageous and desirable for the reliable transmission of torque and axial forces between the coupled elements, since the transmission of forces is effected directly between the coupled element pair through the contacting mating surfaces. Stresses of a shrunk fit coupling from shock will not disrupt the coupling in any manner, nor will they otherwise interfere with the transmission of torques and axial forces between the coupled elements as long as the elements are maintained sufficiently cool so as not to reverse or otherwise loosen by expansion the shrink fitting of one element to the other. Assembly of this type of shrunk fit coupling is, of course, effected by initially heating the contractable element, e.g., the outer sleeve, to expand it sufficiently to telescope it over the inner hub to which it is to be firmly secured. Of course, the relative dimensions of the coupled elements are selected in relation to their thermal coefficients of expansion to insure that, upon heating, the outer part will telescope over the inner part and that upon subsequent cooling, the outer sleeve element will shrink firmly, securely, and immoveably on to the inner element.

While the above-described shrunk fit couplings are well known to and have been widely employed by the art, they possess certain disadvantages which tend to manifest themselves primarily when the coupled elements are to be disassembled. This is especially true for large coupled elements, in which case, a longer preheating period is necessary to expand the outer sleeve which may have been shrunk fit and seated on to a long shaft, for example. It is extremely difficult to maintain the requisite difference in heating and consequent expansion between the outer and inner elements to effect the required expansion of the outer element without effecting a concomitant expansion of the inner element. When both elements expand comparably, the outer element is not freed from the inner element. Of course, it is to be understood that, when the parts are initially assembled, it is a simple matter to heat the outer element independently of the inner element and to slip the heated outer element over the unheated inner element. However, after the coupling has been completed, it is no longer a simple matter to create the requisite temperature gradient between the two coupled elements and to develop differential expansion therebetween. Indeed, when the coupled elements are of substantial length and, therefore, require longer periods of preheating to expand the outer sleeve, it is difficult and often impossible to avoid substantial heat transfer from the outer to the inner element. When the inner element is heated, it expands and disassembly from the outer element becomes impossible, due to the seizing of the parts. Indeed, it is not unusual for the separation of such coupled parts to be effected only by the destruction of the outer sleeve.

It has been proposed that, in order to limit the relative displacement of the parts with respect to one another for disassembly, an arrangement of conically fitting elements be employed. However, elements employing this type of fitting are difficult and expensive to manufacture, more especially if such elements are not mass produced. Moreover, uniform wear of the contact areas between the conically coupled elements may not always be assured, when the elements are manufactured individually and independently. Still further, it is often difficult to ascertain and to determine with precision the stress values of the elements.

SUMMARY OF THE PRESENT INVENTION

The present invention is directed to improved shrunk fit couplings which overcome the above-described shortcomings of earlier devices of this general nature, The new coupling accommodates comparatively shorter preheating durations of the outer sleeve to loosen the same, especially in the case where the new arrangement is employed with elongated coupled elements, and additionally, the new coupling arrangement accommodates simple, known, and inexpensive manufacturing techniques to be employed to form the contacting areas of the elements to be coupled by shrink fitting.

In accordance with the teachings of the present invention, the foregoing advantageous characteristics are obtained in one preferred embodiment, by providing the contact areas of the outer and inner elements with parallel and uniformly distributed grooves separated from one another by lands in a manner whereby the grooves are wider than the lands. As will be understood, the contacting or seat areas of a heat shrunk coupling formed of such elements may be machined with precision, since the contact areas, in all cases, will be disposed in a cylindrical plane. It will be appreciated that conventional turning machinery and techniques may be employed to form the lands and grooves at relatively low cost, and the mating surfaces may be easily machined to precise tolerances and to said cylindrical surface shapes.

In accordance with the present invention, when the grooves are formed axially along the mating cylindrical surfaces of the coupled elements, a simple rotation of the exterior sleeve relative to the interior hub, after the sleeve is preheated to expand and to loosen it with respect to the hub, will be sufficient to permanently separate the parts. Rotation of the sleeve by an amount not greater than the width of a groove will place the axially extending lands, which are of less width than the axially extending grooves, in the grooves where there will be no pressure exerted between exterior elements on the interior elements, even after cooling and contraction. Indeed, if the dimensions of the coupled elements are chosen such that simple friction fit is sufficient to couple the elements (in lieu of a shrink fit), the elements would only have to be rotated relative to one another until the land of one element registers with the groove of the other to uncouple the two elements.

More specifically, the inner coupled element is typically in the form of a hub which may be telescoped on to a shaft and secured thereto by any known means including mechanical fastening, force fitting, or shrink fitting. Such a hub may be machined more easily than an elongated shaft and, therefore, accommodates the employment of the principles of the present invention in the mass production of coupling elements and also accommodates the ready use of the new coupling with shafts not provided with grooves of the type required for the practice of the present invention.

An alternate preferred embodiment of the present invention utilizes annular grooves formed on the mating elements rather than axially extending grooves. It is, of course, easier to form, with turning equipment, annular grooves on cylindrical elements than it is to form axially extending grooves.

A more specific embodiment of the shrunk fit coupling of the present invention utilizes a mechanical stop associated with the two coupled elements to prohibit relative rotation (for elements with annular grooves) between the two elements to no more than the width of the grooves. Similarly, these stops may be employed for embodiments in which the grooves are longitudinal to limit relative axial displacement. Indeed, such stops may be multifunctional, and, in the case of couplings employing axially extending grooves, the stop may, itself, be used as a triggerlike or hammerlike device to initiate relative mechanical displacement of the two elements after the outer element has been expanded and loosened.

An especially advantageous embodiment of the present invention utilizes fins formed on the outer surface of the sleeve element to increase its overall surface area in a manner in which the initial preheating time for expansion is reduced substantially. Of course, reductions in the preheating time for expanding the outer element will tend to reduce the quantity of heat transferred to the inner element, and, therefore, will more readily enable the requisite heat gradient for disassembly to be established and maintained. Of course, the increased surface areas of the fins, as well as accelerating the initial preheating of the element, will also accelerate the dissipation of heat therefrom during contraction of the sleeve, after the heat source has been removed.

To effect the requisite expansion for assembly and disassembly of the coupled elements of the present invention, the exterior sleeve may be preheated by any one of several well known expedients, including the use of a gas burner or of an induction heater. When a gas burner is used, it is advantageous to provide a metal shroud which completely encloses the sleeve and confines the flow of heated gas to a course in and about the fins.

For a better understanding of the present invention and a greater appreciation of its attendant advantages, reference should be made to the following detailed description taken in conjunction with the accompanying drawings.

DESCRIPTION OF THE DRAWINGS

FIG. 1 is a longitudinal side view of a first embodiment of the coupled elements of the present invention showing the elements in elevational view and in cross-sectional view;

FIG. 2 is a transverse, cross-sectional view of the coupling of FIG. 1 taken along line 2—2 thereof;

DETAILED DESCRIPTION OF THE INVENTION

Figure 3:
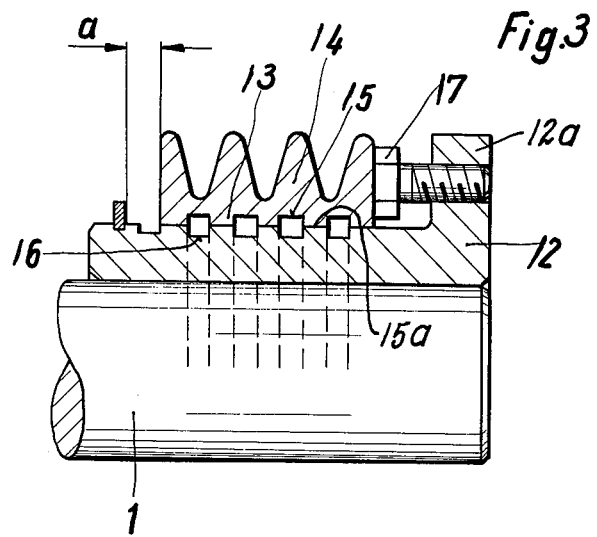
FIG. 3 is a longitudinal, cross-sectional view of an alternate embodiment of the coupling of the present invention in which annular grooves are employed in lieu of axial grooves and in which stops are included for limiting relative axial displacement of the coupled elements.

Referring now to FIG. 1, a first preferred embodiment of the coupling of the present invention includes an inner supporting hub 2 and an outer sleeve 3 telescoped thereover. The inner hub 2, itself, may be supported on a shaft 1. The hub 2 has an internal bore to enable it to be telescoped over the shaft 1 and, on its external surface, it has a plurality of lands 6a formed by the machining of uniformly spaced shallow grooves 6. The width of each groove 6 is greater than the width of the lands 6a therebetween. The convex surfaces of the lands lie in a cylindrical plane having a predetermined diameter. The outer sleeve 3 has a predetermined internal bore diameter established by the convex cylindrical surfaces of lands 5a formed therein by the machining of uniformly spaced axially extending grooves 5 therebetween. The width of the lands 5a is less than the width of the grooves 5. As will be understood, the precise dimension of the inner diameter of the sleeve 3 is chosen such that, when heated and expanded, it is larger than the outer diameter of the inner element 2 and, when allowed to cool freely and unrestrictedly, the inner diameter of element 3 will be less than the outer diameter of the hub 2. Thus, in accordance with shrink fitting techniques, when the lands 5a are heated and expanded and then registered with the lands 6a and allowed to cool, the outer element 3 will be securely shrunk fit to the inner hub 2 along the cylindrical interface between the two elements, as illustrated in FIG. 2.

In accordance with the invention, the assembly of the outer sleeve to the inner hub 2 may be effected as follows: The sleeve 3 may be telescoped over the hub 2 with the lands 5a disposed in the grooves 6. The dimensions of the two parts are such that this telescoping of one part relative to the other may be effected without any expansion of the outer sleeve 3. Thereafter, the sleeve 3, which is provided with radial fins 4, in accordance with the teachings of the invention, may be heated to expand the same and increase the inner diameter of its bore. A leverlike tool may be inserted in a radial opening 9 formed in the outer portions of the sleeve 3 to rotate it until the lands 5a and 6a are in registry. With the lands 5a and 6a so registered, the sleeve element 3 is allowed to cool and to contract to establish a shrunk, friction fit coupling to the inner hub element 2. Advantageously, the arrangement of the grooves 5 and 6 and the cooperating lands 5a, 6a formed therebetween, in conjunction with the fins 4, tend to effect a uniform contraction of the sleeve on the hub 2 and to form a balanced and symmetrical coupling of the elements 2, 3, thereby maximizing the torque which may be transmitted between the coupled elements.

When it is desired to disassemble the coupled elements 2, 3, the above-described procedure is reversed. The sleeve 3 is heated and, after it expands, it is rotated with respect to the hub 2 to align the lands 5a in the grooves 6. The sleeve is then allowed to cool and to shrink once again. However, the hub and the sleeve will be loosely connected and the parts 2, 3 may be separated merely by simple telescopic displacement of one element relative to the other.

As a more important aspect of the present invention and to limit the relative rotation of the sleeve element 3 with respect to the hub element 2, a radial key 7 is inserted through the sleeve 3 and into an arcuate keyway 7a formed at the outer surface of the hub 2 and extending circumferentially at the periphery of the hub for a distance slightly greater than the width of a groove 6. The key 7 and keyway 7a will cooperate to limit relative displacement of the elements 2, 3 both axially and radially, as will be understood.

It is, of course, to be appreciated that, while the coupling of FIGS. 1 and 2 is described in terms of a coupled sleeve 3 and a hub 2, the principles of the invention may be employed to couple the hub 2 to the shaft 1. In that case, axial grooves and concave lands similar to the grooves and lands 5, 5a, respectively, would be formed at the surfaces of the bore of the hub 2, while grooves and convex lands comparable to the grooves and lands 6, 6a, respectively, would be formed on the outer cylindrical surfaces of the shaft 1. The hub 2 would then be assembled to the shaft 1 by shrink fitting in the manner described above for the assembly of the sleeve 3 to the hub 2.

Figure 4:
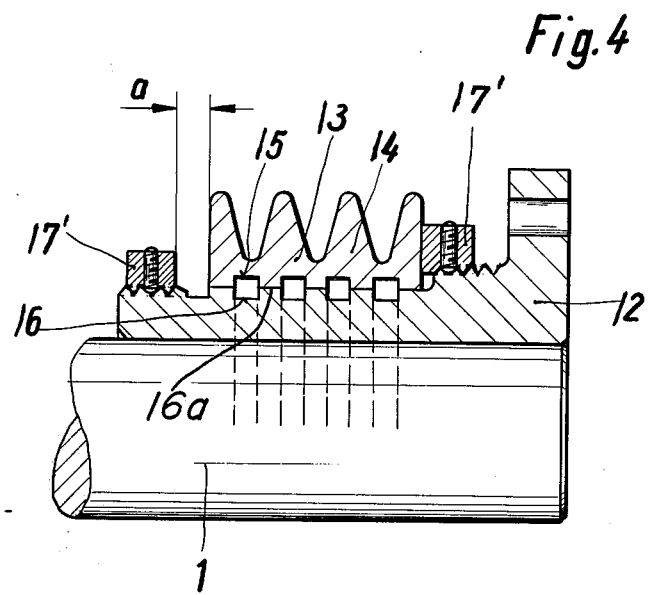
FIG. 4 is a longitudinal, cross-sectional view of a further modification of the coupling of FIG. 3.

In an alternate, preferred embodiment of the invention shown in FIGS. 3 and 4, a sleeve 13 with radial fins 14 is shrunk fit to a hub 12 in a manner similar to that described above. However, annular grooves and lands 15, 15a, respectively, are formed on the inner bore of the sleeve 3, and they are equal in widths to those of the annular grooves and lands 16, 16a, formed on the outer surfaces of the hub 12. Assembly of the sleeve 13 to the hub 12 of the embodiment of the coupling shown in FIGS. 3 and 4 is effected by sliding the sleeve of the hub until it is engaged by the stop 17 supported in the flange 12a of the hub. When the sleeve 13 is cooled and contracted, the lands 15a will be shrunk into firm contact with the lands 16a for a firm coupling of the elements 12, 13, and for the reliable transmission of the torque therebetween. When it is desired to disassemble the elements 12, 13, shown in FIG. 3, the outer sleeve 13 is heated, and it may be axially displaced a small distance a so that the lands 15a on the sleeve 13 register with the grooves on the hub 12, in which position the radial coupling forces between the two elements are eliminated. As will be appreciated, a tool may be used to strike and displace the stop 17, which, in turn, would tend to trigger or dislodge the sleeve 13 from its tightly coupled position (shown in the drawings) to a loosely joined position in which the lands 15a are registered with the grooves 16. The groove, shown in the alternate embodiments are, of course, slightly wider than the lands formed therebetween. If desired, and as shown in FIG. 4, a pair of stops 17' may be employed to limit the relative axial displacement between the elements 13 and 12, respectively.

It is to be understood that the shrunk fit couplings herein illustrated and described are intended to be representative only, as certain changes may be made therein without departing from the clear teachings of the disclosure. Accordingly, reference should be made to the following appended claims in determining the full scope of the invention.

I claim:
1. A shrunk fit coupling, comprising
   (a) an outer sleeve means having a cylindrical bore of first predetermined diameter when heated and expanded and a second predetermined diameter when cooled and contracted;
   (b) an inner cylindrical hub means having an outer diameter less than said first predetermined diameter and greater than said second diameter;
   (c) plural, parallel groove means formed in each of said cylindrical bore of said sleeve means and said cylindrical hub means to provide each with a plurality of uniformly spaced, parallel land means of uniform width;
   (d) said groove means being of uniform width and wider than said land means;
   (e) said groove means and said land means being disposed circumferentially of said sleeve means and said hub means to establish longitudinal grooves and lands spaced radially from one another about the axes of said sleeve means and said hub means; and
   (f) means limiting relative displacement of said sleeve means with respect to said hub means to the width of one of said groove means.

2. A shrunk fit coupling easily disassembled by the application of heat, comprising
   (a) sleeve means having a cylindrical bore;
   (b) hub means;
   (c) a plurality of parallel grooves formed in each of the surface of said cylindrical bore and the surface of said hub means forming therein a plurality of uniformly spaced, parallel lands of uniform width alternating with said grooves;
   (d) said grooves being of uniform width and wider than said lands;
   (e) said lands on said cylindrical bore surface forming a first predetermined diameter for said bore when heated and expanded and a second predetermined diameter for said bore when cooled and contracted;
   (f) said lands on said hub means surface having a diameter for said hub means less than said first predetermined diameter and greater than said second predetermined diameter;
   (g) means limiting relative displacement of said sleeve means with respect to said hub means to the width of one of said grooves; and
   (h) the cylindrical surfaces of said lands on said hub means and said cylindrical bore being adjacent and firmly united by the thermal contraction of said sleeve means.

3. The coupling of claim 2, which includes a plurality of radially projecting heat transfer fins on the outer surface of said sleeve for enhancing the expansion thereof in the disassembly of said coupling.

4. The coupling of claim 2, in which
   (a) said groove means and said land means are annular and are spaced axially of each other along said sleeve means and said hub means.

5. The coupling of claim 2, in which
   (a) the cylindrical surfaces of the land means of said sleeve means are firmly and securely united with the cylindrical surfaces of the land means of said hub means by the thermal contraction of said sleeve means.

6. The coupling of claim 2, further characterized in that
   (a) said limiting means is adjustable axially of said coupling.

* * * * *